(12) United States Patent
Wilton et al.

(10) Patent No.: US 11,009,592 B2
(45) Date of Patent: May 18, 2021

(54) LIDAR SYSTEM AND METHOD

(71) Applicant: Princeton Lightwave, Inc., Cranbury, NJ (US)

(72) Inventors: Samuel Richard Wilton, Hamilton, NJ (US); Evgenii Yuryevich Kotelnikov, Princeton, NJ (US); Igor Kudryashov, Pennington, NJ (US)

(73) Assignee: ARGO AI, LLC, Pittsburgh, PA (US)

( * ) Notice: Subject to any disclaimer, the term of this patent is extended or adjusted under 35 U.S.C. 154(b) by 832 days.

(21) Appl. No.: 15/614,814

(22) Filed: Jun. 6, 2017

(65) Prior Publication Data

US 2017/0350967 A1    Dec. 7, 2017

Related U.S. Application Data

(60) Provisional application No. 62/345,927, filed on Jun. 6, 2016.

(51) Int. Cl.
| | |
|---|---|
| *G01S 7/48* | (2006.01) |
| *G01S 7/481* | (2006.01) |
| *G01S 17/42* | (2006.01) |
| *G01S 17/89* | (2020.01) |
| *G01S 7/4863* | (2020.01) |
| *G01S 17/10* | (2020.01) |
| *G01S 17/931* | (2020.01) |

(52) U.S. Cl.
CPC ......... *G01S 7/4817* (2013.01); *G01S 7/4863* (2013.01); *G01S 17/10* (2013.01); *G01S 17/42* (2013.01); *G01S 17/89* (2013.01); *G01S 17/931* (2020.01)

(58) Field of Classification Search
CPC .... G01S 7/4817; G01S 17/931; G01S 7/4863; G01S 17/10; G01S 17/42; G01S 17/89
See application file for complete search history.

(56) References Cited

U.S. PATENT DOCUMENTS

2017/0176579 A1* 6/2017 Niclass ................. G01S 17/42

* cited by examiner

*Primary Examiner* — Luke D Ratcliffe
(74) *Attorney, Agent, or Firm* — Kaplan Breyer Schwarz, LLP

(57) ABSTRACT

Disclosed are improved LiDAR systems and methods that achieve an improved signal-to-noise by interrogating a sub-region of a scene with an optical signal. An instantaneous field-of-view (FOV) of each detector pixel is narrowed along a first direction to reduce detection of solar-generated photons. Instantaneous FOVs of the pixels are compressed along the first direction to provide a composite FOV that is narrower than a total FOV. To sample the total FOV of a scene, the optical signal and composite FOV of the receiver are scanned across the scene along the first direction.

14 Claims, 12 Drawing Sheets

FIG. (5A)

LIDAR SYSTEM AND METHOD

CROSS REFERENCE TO RELATED APPLICATIONS

This application claims the benefit of U.S. Provisional Patent Application Ser. No. 62/345,927 filed on 6 Jun. 2016, the contents of which are incorporated by reference as if set forth at length herein.

TECHNICAL FIELD

This disclosure relates generally to scanning optical ranging and detection systems and methods. More particularly, it pertains time-of-flight light detection and ranging (LiDAR) systems and methods exhibiting a high signal-to-noise ratio (SNR) throughout its overall scan range.

BACKGROUND

The ability to measure distance and reflectivity of objects within an environment without physically touching those objects is of great interest to many fields. LiDAR—and more particularly time-of-flight (TOF) based LiDAR—is a distance range measurement technique in which a brief laser light pulse is emitted and a reflected light pulse is detected while the time between the emitted light pulse and the reflected light pulse is measured. This time of flight of the laser light pulse from the time it is emitted until its reflected pulse is detected corresponds to the distance between a LiDAR detector and an object.

SUMMARY

An advance is made in the art according to aspects of the present disclosure directed to LiDAR systems and methods exhibiting a high SNR while maintaining an overall laser power below acceptable safety thresholds. Advantageously—and in sharp contrast to the prior art—LiDAR systems and methods according to the present disclosure realize such benefits without utilizing narrow solar-bandpass filter(s).

A modified system optics that substantially spatially minimizes the collection of sunlight without sacrificing signal-collection efficiency and without sacrificing total image field of view (FOV). Improved SNR is achieved by reducing the divergence of an optical signal used to interrogate a scene of interest, while simultaneously restricting the field-of-view of a receiver used to detect reflections from the scene. The field-of-view of each single detector within a detector array of the receiver is changed either by changing the focal length of the receiver optic or changing the size of the detector.

An illustrative LiDAR system embodiment according to the present disclosure incudes: a transmitter operative for interrogating a sub-region of a scene with an optical signal, the optical signal having an illumination pattern having a first divergence in a first direction and a second divergence in a second direction that is orthogonal to the first direction, the first divergence and the second divergence defining a lateral extent of the sub-region, wherein the lateral extent of the sub-region is smaller than the lateral extent of the scene in the second direction; a receiver operative for sampling the sub-region by detecting reflections of the optical signal that originate within the sub-region, the receiver including a plurality of pixels that each have a single-photon detector, wherein each pixel exhibits an instantaneous field-of-view having a first angular range in the first direction and a second angular range in the second direction, and wherein the plurality of pixels are arranged such that they collectively define a focal-plane array having a composite field-of-view (CFOV) that substantially matches the sub-region; a scanner operative for scanning the sub-region along the second direction such that the complete scene is interrogated and sampled during a scan period.

An illustrative LiDAR method according to the present disclosure includes: interrogating a sub-region of a scene with an optical signal wherein the optical signal has an illumination pattern exhibiting a first divergence in a first direction and a second divergence in a second direction that is orthogonal to the first direction, the first divergence and second divergence defining a lateral extent of the sub-region, wherein the lateral extent of the sub-region is smaller than the lateral extent of the scene in the second direction; sampling the sub-region by detecting reflections of the optical signal that originate within the sub-region, wherein the reflections are detected by a receiver including a plurality of pixels that each have a single-photon detector, and wherein each pixel exhibits an instantaneous field-of-view (IFOV) having a first angular range in the first direction and a second angular range in the second direction, and wherein the plurality of pixels are arranged such that they collectively define a focal-plane array having composite-field-of-view (CFOV) that substantially matches the sub-region; and scanning the sub-region along the second direction such that the complete scene is interrogated and sampled during a scan period.

This SUMMARY is provided to briefly identify some aspect(s) of the present disclosure that are further described below in the DESCRIPTION. This SUMMARY is not intended to identify key or essential features of the present disclosure nor is it intended to limit the scope of any claims.

The term "aspect" is to be read as "at least one aspect". The aspects described above and other aspects of the present disclosure are illustrated by way of example(s) and not limited in the accompanying drawing.

BRIEF DESCRIPTION OF THE DRAWING

A more complete understanding of the present disclosure may be realized by reference to the accompanying drawing in which:

FIG. 3(A), FIG. 3(B), FIG. 3(C), and FIG. 3(D) show illustrative images of a scene acquired with staring-mode receivers in which: FIG. 3(A) was acquired using uncompressed pixels; FIG. 3(B) was acquired using compressed pixels; FIG. 3(C) was acquired using IFOV compression and array FOV compression to obtain a contiguous image field; and FIG. 3(D) illustrates a representation of pixel regions sampled by both IFOV compression in the x-direction and scanning of sub-region(s) along the x-direction, each according to aspects of the present disclosure;

FIG. 5(A) and FIG. 5(B) show illustrative schematics of the interrogation of a scene with a plurality of pulses using LiDAR systems as shown in FIG. 4(A), and FIG. 4(B) according to aspects of the present disclosure;

FIG. 6(A) and FIG. 6(B) show illustrative examples of data corruption due to object motion during formation of an image of a scene for images acquired in: FIG. 6(A) staring-mode; and FIG. 6(B) scanning mode, according to aspects of the present disclosure;

FIG. 7(A) and FIG. 7(B) show illustrative scanning methods respectively wherein FIG. 7(A) shows continuous scanning and FIG. 7(B) shows step-wise scanning according to aspects of the present disclosure.

DETAILED DESCRIPTION

Figure 1:
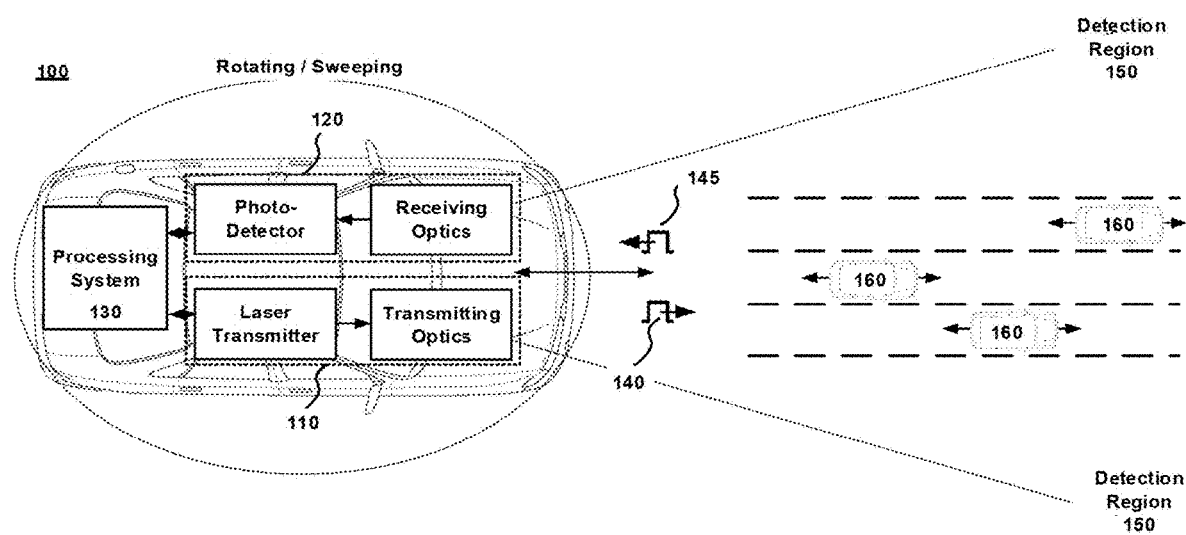
FIG. 1 shows a schematic diagram depicting an illustrative, prior-art vehicle LiDAR system.

The following merely illustrates the principles of the disclosure. It will thus be appreciated that those skilled in the art will be able to devise various arrangements which, although not explicitly described or shown herein, embody the principles of the disclosure and are included within its spirit and scope. More particularly, while numerous specific details are set forth, it is understood that embodiments of the disclosure may be practiced without these specific details and in other instances, well-known circuits, structures and techniques have not been shown in order not to obscure the understanding of this disclosure.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the disclosure.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

By way of some additional background, we begin by noting that advances in LiDAR systems and methods have enabled practitioners to scan large areas while collecting billions of data points, each with a precise latitude, longitude, and elevation (x, y, z) values within a local (relative) coordinate system. This aggregation of the billions of data points is referred to as a point cloud data set. Practitioners subsequently extract object locations from the point clouds data set and use that location information for subsequent decision making.

As is known, such decision making finds widespread applicability in a number of applications including—but not limited to—automobiles and farm equipment—both driven and driverless.

With LiDAR systems such as those known in the art, a local map is created representing an area around a vehicle—for example—by performing scans in several directions and elevations around the vehicle. Prior-art LiDAR systems may employ different mechanisms to accomplish such scans, such as using an array of laser sources, rotating a single laser source about an axis as projected through the vehicle, or directing an output signal from a single source about the vehicle using a rotating mirror or prism or a stationary reflective cone. By way of illustrative example of such prior-art systems, United States Patent Application Publication No. 20110216304 discloses a LiDAR system employing a vertically oriented array of emitter/detector pairs that are rotated to provide a 360° horizontal field-of-view (FOV) and a vertical FOV of several tens of degrees. The prior art system so disclosed emits multiple pulses of light at a high repetition rate while the emitter/detector assembly is scanned about the vehicle. The resultant distance measurement form the bases for a three-dimensional simulated image of a scene around the vehicle.

As will be readily appreciated by those skilled in the art, LiDAR systems used in automotive—or other vehicular applications—must exhibit a number of characteristics that are quite challenging to achieve. For example, an automotive LiDAR system requires a large FOV in both horizontal and vertical directions—where the FOV is supported over a distance that ranges from approximately 5 meters (m) to approximately 300 m. Furthermore, such an automotive LiDAR system must exhibit a high resolution in addition to the ability to interrogate a changing environment around an automobile—which may be traveling at a high speed. Accordingly, an automotive LiDAR system must be able to update the generated local map of the area around the vehicle at a very high frequency. Finally, an automotive LiDAR system must exhibit a high signal-to-noise ratio (SNR) over a wide range of ambient light conditions and over its entire operating distance (i.e., scan range).

Further appreciated by those skilled in the art is the knowledge that LiDAR system performance is generally proportional to its exhibited SNR. Additionally, in order to improve signal strength over a full scan range of a LiDAR system, it is desirable to increase the output power of the laser used to interrogate the field-of-view of the system. Unfortunately, eye safety considerations restrict the maximum laser power that may be used. Further, the noise level for the system is sensitive to solar background radiation. This sensitivity is particularly acute for Geiger-mode LiDAR systems, i.e., systems employing single-photon detectors.

In an attempt to reduce the noise contribution of such solar background radiation, spectral filtering techniques have been employed in the art. Unfortunately, the narrowness of such filters is restricted by the spectral width of the transmitter, system temperature variation, and any optics employed in the system—thereby limiting the improvement in SNR that may be achieved by simply employing a spectral filter.

Advantageously, LiDAR systems and methods according to the present disclosure overcome such infirmities and exhibit a high SNR throughout its entire scan range.

As is known, point cloud data sets may be collected by a Geiger-mode avalanche photodiode (GmAPD-based LiDAR system such as that illustratively shown in FIG. 1. As depicted in that FIG. 1, GmAPD-based LiDAR system 100 generally comprises a transmitter 110 including laser transmitter(s) and transmitting optics, receiver 120 including receiving optics and photo-detector(s), and processing system 130. As illustratively shown in FIG. 1, LiDAR system(s) may be mounted on movable platforms such as an automobile. While not specifically shown in FIG. 1, such LiDAR system(s) may be mounted on fixed or other movable platforms including land, sea, airborne and/or space vehicles. Still further, such platforms may be configured or individually combined to sweep or scan over a large volume such that a full 360 degree environmental view may be made.

Operationally, the transmitter periodically transmits interrogating signal(s) 140 into a detection region (or field of view) 150 from which they may be reflected back as return signal(s) 145. Generally, the interrogating signal(s) are a train of optical-pulses exhibiting a period Ti and a wavelength and intensity suitable for interrogating the detection region. The wavelength(s) of the interrogating signal(s) are oftentimes in the range of 900 nm to 2000 nm however, other usable wavelengths are known in the art.

In an exemplary GmAPD-based LiDAR system embodiment such as that illustrated in FIG. 1, the transmitter may include a laser source—such as a diode laser—which emits the optical pulses of interrogating signal(s) in response to drive signal(s) from—for example—the processing system. As each optical pulse of interrogating signal propagates through the detection region, objects 160 reflect a portion of a pulse's optical energy back toward system 100 as reflected optical pulse(s) in return signal(s) which may be detected by the receiver.

In contemporary embodiments, the receiver may include an array of GmAPD detector pixels (not specifically shown). As will be readily appreciated and understood by those skilled in the art, one particular advantage of GmAPDs is that they quickly produce an electrical pulse in response to the detection of even a single photon—allowing for sub-nsec-precision photon-flight-time measurements. When each pixel is armed, it may detect a low-intensity reflection of an interrogation signal (return signal) and output a signal to be detected and subsequently used by the processing system.

Note further that in illustrative embodiments the processing system may also provide gating signal(s) to pixels of the receiver (not specifically shown) that enables them to selectively detect photons received.

While the operational physics of avalanche photodiodes and in particular avalanche photodiodes operated in a Geiger-mode are known and understood, it is notable that the use of GmAPD detectors is generally not concerned with multiplication noise but rather with detection probability—namely the probability that an incident photon will produce a detection event. Such probability is the product of the quantum efficiency, which is the probability that a photon will be absorbed in the active region of the device, and the avalanche probability which is the probability that a photo-electron (or hole) will initiate an avalanche that does not terminate prematurely. Furthermore, it is noted that Geiger-mode detection events do not provide intensity information. An electrical pulse produced by the detection of a photon is indistinguishable from that produced by the detection of many simultaneously absorbed ones. Accordingly, a single thermally generated electron or hole can initiate an avalanche, leading to an electrical pulse that is indistinguishable from a photon detection. In LiDAR applications, such an event represents a false alarm whose probability needs to be minimized. Finally, since the electrical pulse from an APD is used in LiDAR to measure the arrival time of an optical pulse, a user must be concerned with the statistical variation of the time interval between pulse arrival and resulting electrical signal from the APD. Given these noted characteristics—and others—we describe herein techniques and associated methods for improving the reliability of detection data produced from GmAPDs and in particular those employed in LiDAR applications.

Figure 2:
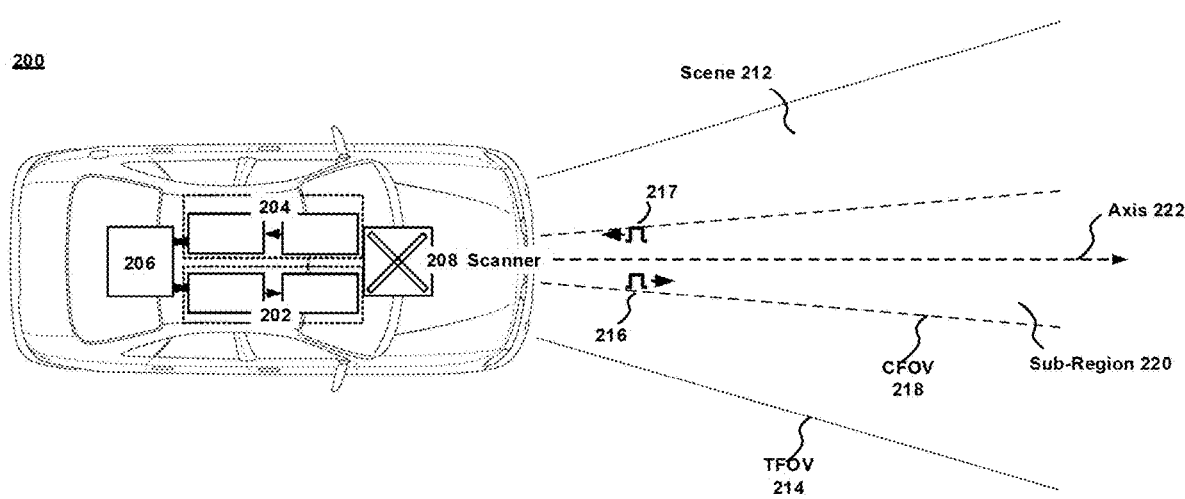
FIG. 2 shows a schematic diagram depicting an illustrative vehicle LiDAR system according to an aspect of the present disclosure.

FIG. 2 is a schematic drawing of an illustrative LiDAR system according to an aspect of the present disclosure. As shown in that FIG. 2, the LiDAR system 200 includes transmitter 202, receiver 204, processor 206, and scanner 208 which are shown as being arranged and mounted on an automobile (vehicle).

As will be readily understood by those skilled in the art and from this discussion previously, system 200 is suitably configured and operative to interrogate a scene 212 within an overall detection region with a series of optical pulses 216 and detecting reflections of those pulses 217. From those reflections received/detected from the scene 212, the system 200 determines the location(s) of any objects within the scene from arrival time(s) of the reflection(s). Note that as used herein, a scene—such as scene 212—is simply a place or location where the LiDAR interrogation takes place.

As may be further observed from FIG. 2, scene 212 is defined by a total field of view (TFOV) 214 which has a lateral extent along an x-direction and a vertical extent along a y-direction.

Transmitter 202, is a system for generating and/or transmitting optical signals (not specifically shown) that generally include a train of relatively short-duration optical (laser) pulses. As may be appreciated, such optical signals may include a first divergence in the y-direction (i.e., vertical) and a second divergence in the x-direction (i.e., horizontal).

Receiver 204 in an illustrative embodiment according to aspects of the present disclosure that may include a focal-plane array comprising—for example—a 7×7 array of pixels, each of which includes a single-photon detector and optics that define the instantaneous field-of-view of the pixel. In the illustrative embodiment shown in FIG. 2, the optics of each pixel may provide an instantaneous field-of-view (IFOV) of approximately 0.2 degrees in the x-direction and approximately 1.4 degrees in the y-direction. The optics of the pixels may advantageously be collectively dimensioned and arranged to compress the IFOVs of the pixels along the x-direction such that they collectively form a composite field-of-view 218 such that it exhibits substantially no gaps between the IFOVs of the individual pixels. In other words, it exhibits a continuous field-of-view in each dimension.

As a result, the CFOV of the focal-plane array is approximately 1.4 degrees in the x-direction and approximately 10 degrees in the y-direction. Consequently, CFOV 218 is substantially "matched" to the divergence of the optical signals. As noted previously, on advantage aspect of the present disclosure is the reduction of the IFOV of each pixel, coupled with reducing any laser divergence of the interrogating signal commensurately—thereby resulting in an improved SNR. Note that while a CFOV 218 enables the receiver 204 to sample sub-region 220, which is smaller than TFOV 214 in the x-direction but the same size as TFOV 214 in the y-direction.

Note that in certain implementations, optics of receiver 204 may result in small gaps between the IFOVs of the individual pixels. Accordingly, it is desirable to keep the size of these gaps sufficiently small so as to mitigate any negative impact on system performance. Of particular advantage, systems, methods and structures according to aspects of the present disclosure include CFOVs both having gaps between the IFOVs of the some or all of the individual pixels, as well as CFOVs that are substantially gap-free.

At this point note further that the size of the focal-plane array, the IFOV of each pixel and the CFOV of the focal-plane array are all matters of design choice and as such may exhibit any suitable and/or practical value without departing from the teachings of this disclosure.

With continued reference to FIG. 2, we note that processor/processing system 206 may include any of a variety of known, integrated or discrete systems that—among other things—receive signals from receiver 204, determine object locations based on signals, generating a point cloud for a scene 212, controlling scanner 208, and the like. Further details of such processor/processing system is shown and described in a later figure.

Scanner 208—according to yet another aspect of the present disclosure—is operative to scan optical signal(s) and CFOV 218 across scene 212 during a scan period such that overall system 200 interrogates and samples the entirety of scene 212 during each such scan period. As may be readily appreciated, the particular choice of scanner is a matter of design choice. Accordingly, and according to yet another aspect of the present disclosure, scanner 208 may include a galvanometer scanner, a rotating, multi-faceted mirror, a scanning MEMS mirror, and/or a transmissive element(s) (i.e., a scanning prism, etc.) that steers optical signals via any of a number of known mechanisms including refraction, and the like. Those skilled in the art will of course recognize that a scanner 208 according to the present disclosure may further include a mix of the scanning elements described and/or known.

As previously noted, the divergence of optical signals and CFOV 218 are compressed in the x-direction. As such, illustrative embodiments according to the present disclosure exhibit significant advantages with respect to prior-art LiDAR systems, methods and structures. More specifically, this compressed CFOV in the x-direction gives rise to a significant reduction in any solar background energy detected by receiver 204 without significantly affecting optical-signal-flux density at the receiver thereby improving SNR.

As will be readily understood and appreciated by those skilled in the art, solar-flux density is distributed uniformly across surfaces of solar-illuminated objects in a particular scene. As a result, by viewing a smaller fraction of surface area(s) on any given object, less sunlight is detected by detector pixels. Furthermore, since laser-flux density in a LiDAR system may be shaped to match the IFOV, the cumulative number of reflected signal photons within the view of the receiver will be the same, but the cumulative number of reflected solar photons within the view of the receiver is proportional to the angle subtended by the surface viewed. Stated alternatively, optical-signal-flux density may be increased by the transmit optics by reducing divergence, but solar-flux density incident on a given surface is constant.

Of course, one skilled in the art will quickly recognize and understand however, that reducing IFOV also limits—or reduces—the extent of scene 212 that is seen by receiver 204 at any given time (i.e., CFOV 218). Systems, methods and structures according to aspects of the present disclosure advantageously overcome such infirmity by including scanner 208 to scan CFOV 218 across an original, intended view of the scene (i.e., TFOV 214). In effect, the detector field of view is first compressed by modifying the optical system to image over a smaller angle, and then re-expanded by scanning the detector across a desired total angle and integrating any data collected throughout this sweep. Of course, this concept according to the present disclosure may advantageously be expanded to a 1D scanning architecture, whereby an array of detectors exhibiting high optical or physical aspect ratios are scanned across the field of view in the direction of the "slender" axis.

Figure 3A:
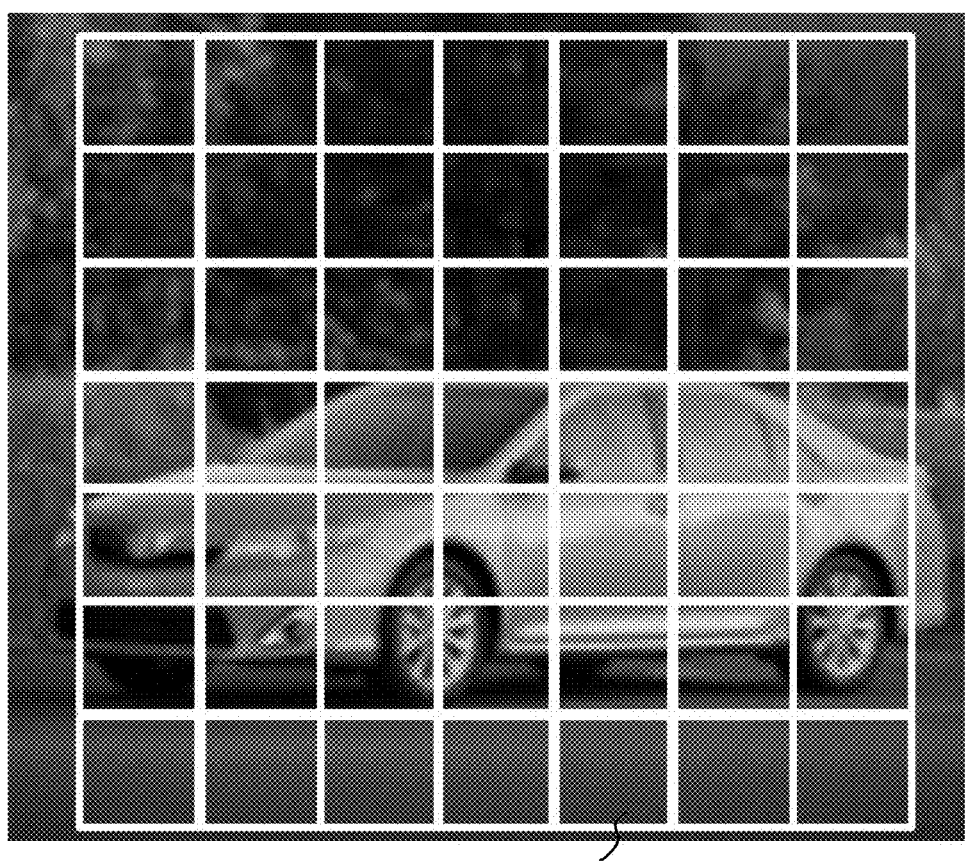
Figure 3B:
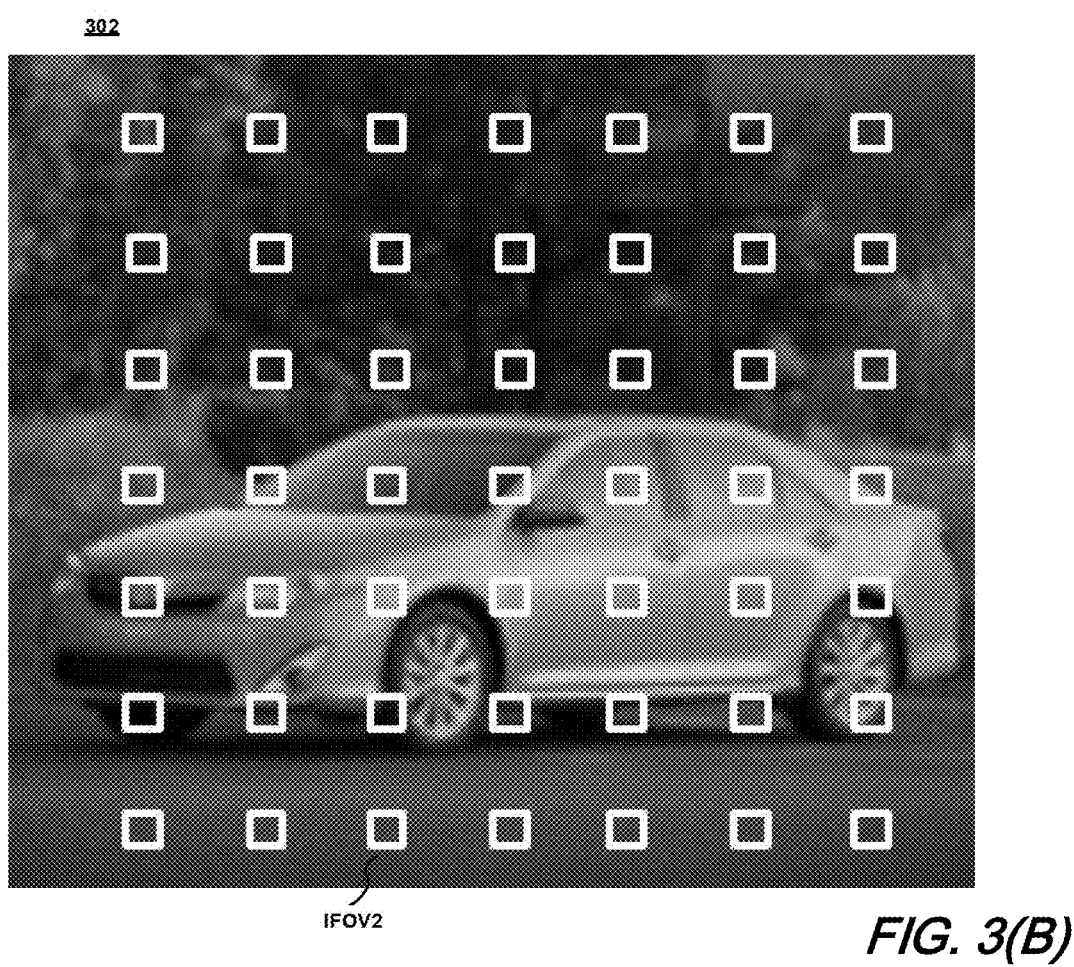

Turning now to FIG. 3(A) and FIG. 3(B), there is shown illustrative image(s) acquired with staring-mode receiver(s) having uncompressed and compressed IFOV pixels, respectively. As is known, a staring array is an image sensing device including an array (typically rectangular) of light-sensing pixels at a focal plane of a lens. Each of the images 300, 302, is acquired using the same illustrative transmitter system in which the scene is interrogated with trains of pulses having an energy of substantially 10 nJ.

With respect to FIG. 3(A), image 300 is shown as continuous across the entire extent of the scene, which in this illustrative example exhibits a TFOV or approximately 10×10 degrees. Illustrative receiver optics employed to yield image 300 exhibits a focal length of substantially 10 mm and an aperture of approximately 4 mm$^2$, which yields a pixel having an IFOV1 substantially equal to 5×5 milliradians. For this illustrative configuration, received sunlight flux at each detector pixel is normalized as approximately 1 mm$^{-2}$.

Turning now to FIG. 3(B), image 302 however is acquired using receiver optics having a focal length of substantially equal to 50 mm and an aperture of approximately 100 mm$^2$, which yields a pixel having IFOV2 that is equal to 1×1 milliradians. As a result, the received sunlight flux is substantially equal to 0.04 mm$^{-2}$, a reduction of approximately 96% from that of image 300 shown in FIG. 3(A).

It is noted that for a fixed aperture of substantially 4 mm$^2$, received signal power remains substantially unchanged. However, the received solar flux is reduced by a factor of approximately 25. If—on the other hand—the aperture were fixed at 100 mm$^2$, the received solar flux remains substantially constant while received signal power increases by a factor of approximately 25.

At this point those skilled in the art will appreciate that it is difficult to exploit a reduced IFOV for a matrix of staring pixels. First, to reduce IFOV without sacrificing total FOV, transmit and receive light paths must be carefully engineered. Second, a multi-spot beam splitter is preferably employed to split an interrogating optical signal into a plurality of discrete, high-intensity spots. Third, the pixels are spaced apart on the sensor so there is a gap between pixels.

In some illustrative embodiments according to the present disclosure however, in combination with IFOV compression, compression of the array FOV along at least one axis enables an image region to be acquired that is either characterized by gaps small enough to mitigate their negative impact on system performance or is substantially gap-free, as embodied by the illustrative embodiment described previously with respect to FIG. 2. The contiguous region however, has a much smaller composite FOV in the axis of compression.

As previously mentioned—and while difficult—in some illustrative embodiments according to the present disclosure a matrix of staring pixels having a reduced IFOV is formed through the effect of a holographic optical element that reshapes interrogating optical signals into a plurality of beamlets.

Figure 3C:
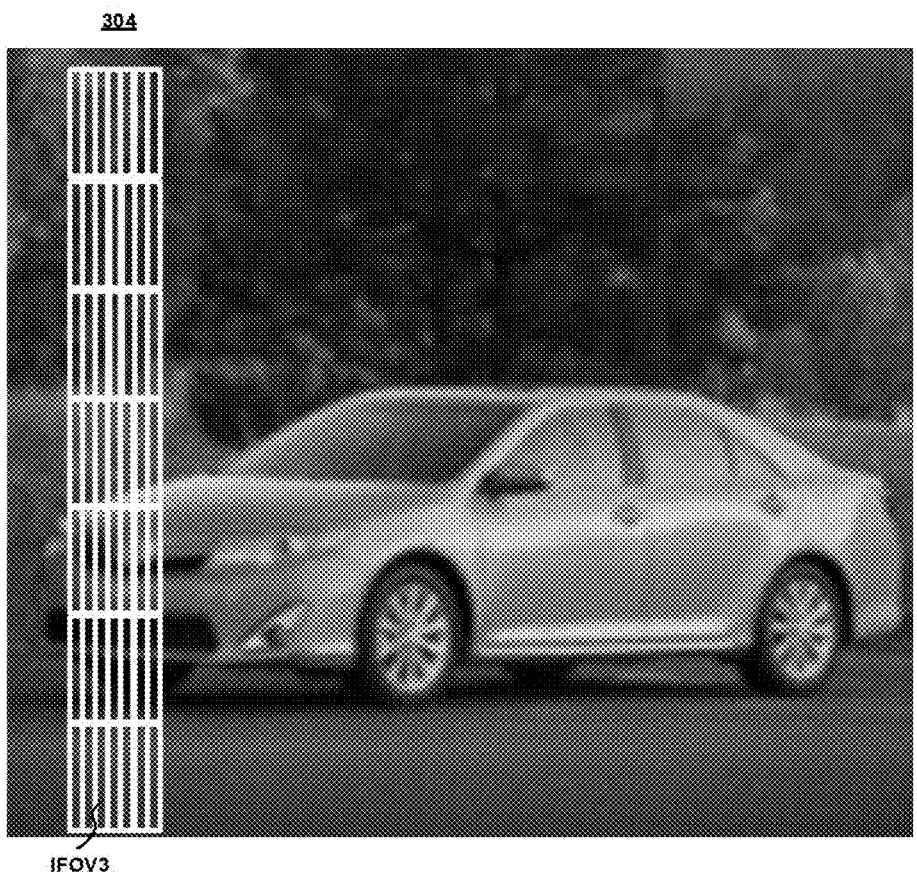

With reference now to FIG. 3(C), there is shown an illustrative image of a scene using pixel IFOV compression and array FOV compression to obtain a contiguous image field according to an aspect of the present disclosure. As shown in FIG. 3(C), in image 304 the region imaged by the receiver is now limited to sub-region 320 which includes a plurality of asymmetrical pixel regions having IFOV3, where IFOV3 exhibits a reduced dimension in the x-direction.

As may be appreciated, in order to recover the entire field-of-view of the scene, entire sub-region must be scanned along the x-direction as described above.

Figure 3D:
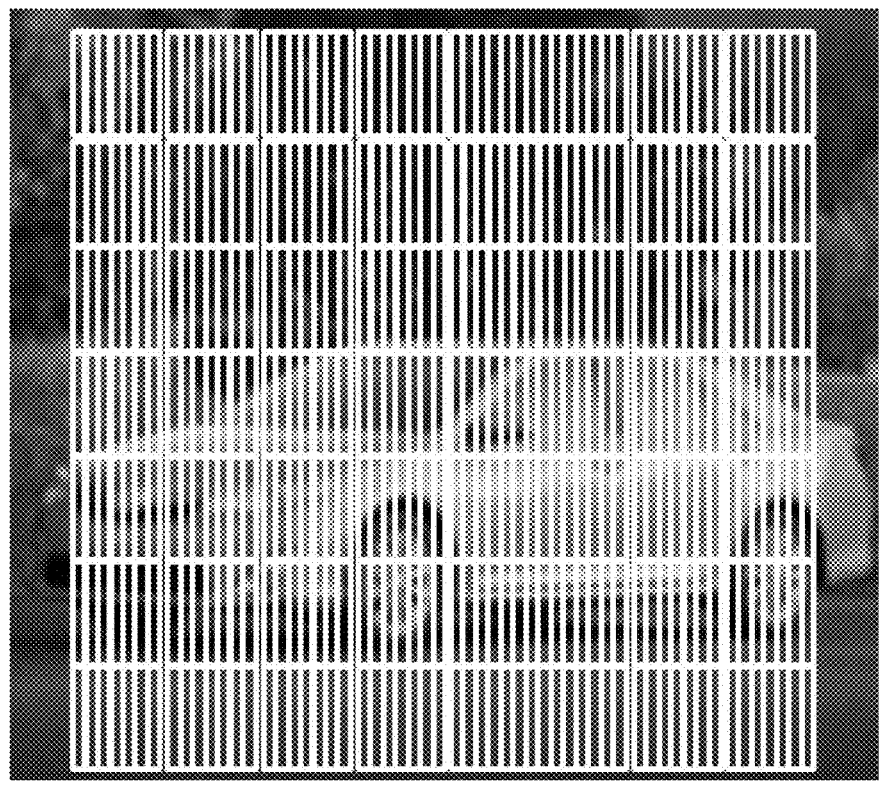

With reference now to FIG. 3(D), there is shown a schematic illustration of pixel regions sampled using both IFOV compression in the x-direction and scanning of sub-region along the x-direction.

Figure 4A:
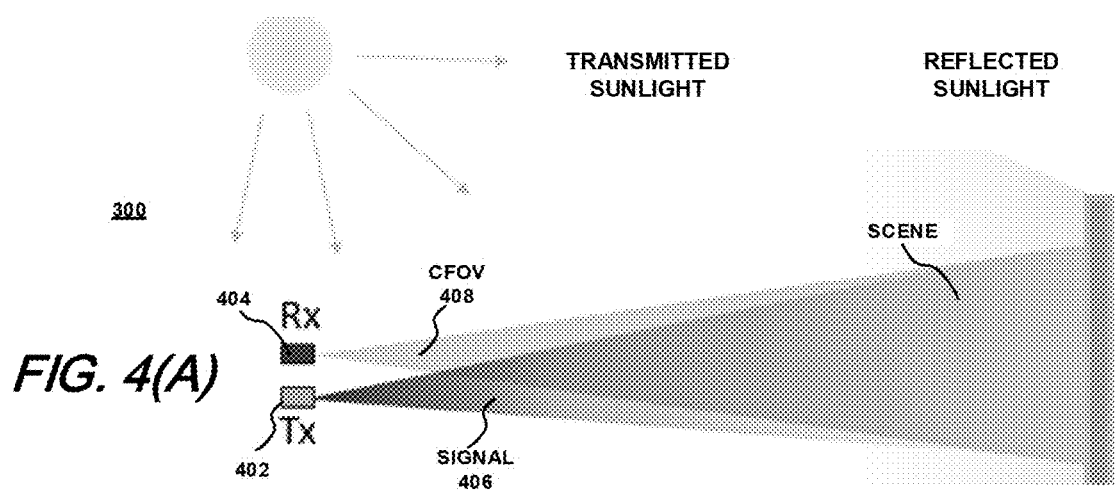
FIG. 4(A) and FIG. 4(B) show illustrative schematics of LiDAR systems having different FOV and SNR according to aspects of the present disclosure.
Figure 4B:
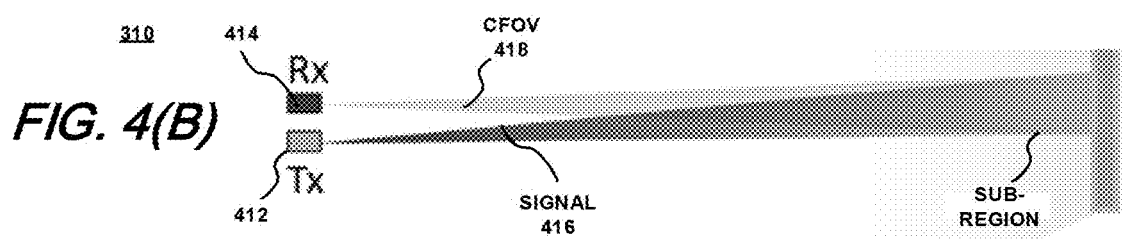

Turning now to FIG. 4(A) and FIG. 4(B), which depict schematic illustrations of LiDAR systems according to the present disclosure having different FOV and SNR characteristics.

With initial reference to FIG. 4(A), it may be observed that illustrative LiDAR system 400 includes a transmitter 402 and a receiver 404. Note that in these illustrative schematics shown in these figures, a number of elements not essential for this particular discussion are omitted for clarity.

Transmitter 402 generates/emits optical signal 406 which exhibits a sufficiently wide divergence. Similarly, receiver 404 exhibits a sufficiently wide CFOV 408 such that the receiver images the entirety of scene.

With simultaneous reference now to FIG. 4(B), it may be observed that LiDAR system 410 includes transmitter 412, and receiver 414. In contrast to that shown in FIG. 4(A), transmitter 412 provides optical signal 416 which has a narrower divergence that optical signal 406. In a similar fashion, receiver 414 exhibits a narrower CFOV 418 and therefore views a smaller portion of scene, namely sub-region 420.

As may be readily understood and appreciated by those skilled in the art, the solar flux-density on receiver 404 is significantly higher than that incident on receiver 414 due to its wider FOV however, the optical-signal-flux density at each of receivers 404 and 414 is substantially identical. As a result, system 410 exhibits a greatly improved SNR as compared to system 400, which is derived at the cost of having to scan the sub-region across the width of the scene to recover the full FOV of system 400.

At this point we note that systems, methods, and structures according to the present disclosure overcome a number of disadvantages exhibited by prior-art LiDAR systems.

First, by using a longer focal length lens in the scanning axis, the maximum allowable aperture size increases, thereby allowing better tuning of maximum absolute signal/noise levels.

Second, by compressing IFOV along the direction of the scanning axis (the x-axis in the illustrative examples shown and described) the spatial resolution of each detection event is improved, which results in better image-processing.

Third, and due to the fact that data from a local spatial region is integrated for a shorter time duration, the amount of motion blur in any local region of the image is reduced.

Fourth, since a smaller angular subtense is being viewed at any given time, optical artifacts stemming from strong reflections (e.g., solar glint, etc.) and emitters (e.g., headlights, flood lights, etc.) are constrained only to the local portion of the image from which they were viewed.

As should be further apparent to those skilled in the art, although the reduced FOV may be exploited to increase SNR—by natural consequence—it also limits the view of the scene that can be seen by the detector array at a given time. In illustrative embodiments according to the present disclosure, such infirmity is overcome by employing an optical scanner to scan CFOV along the axis of pixel compression to recover the original, intended view of the scene.

Figure 5B:
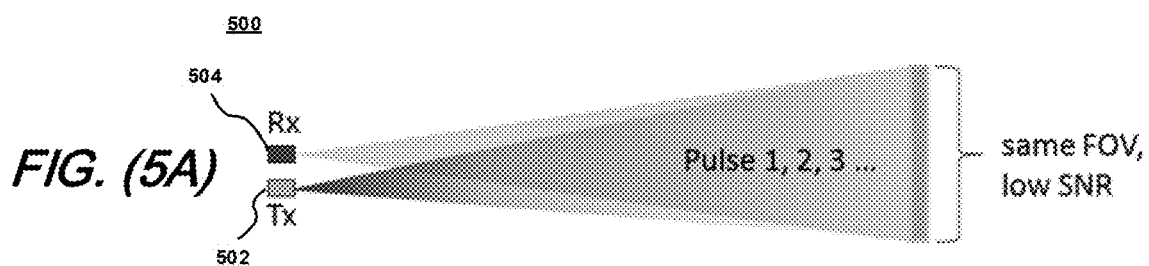
Figure 5B:
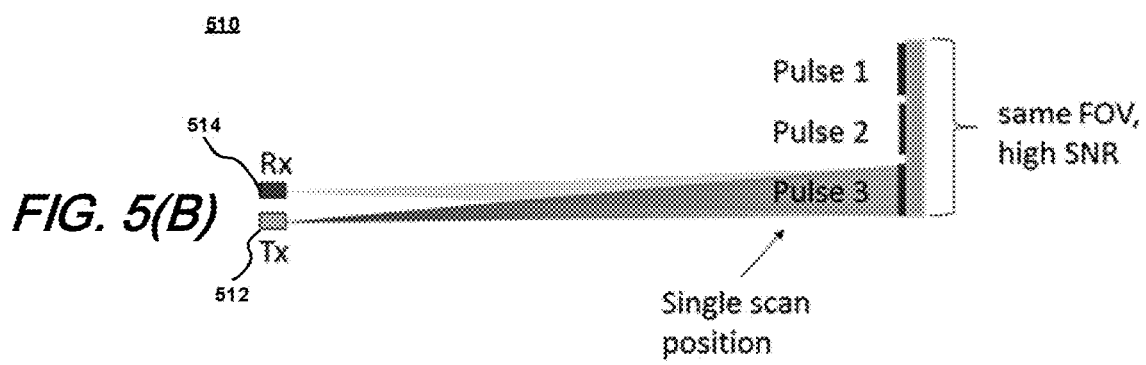

FIG. 5(A) and FIG. 5(B) show illustrative schematics of the interrogation of a scene with a plurality of pulses using LiDAR systems as shown in FIG. 4(A), and FIG. 4(B) according to aspects of the present disclosure. With reference to those figures, we note that the viewpoint of systems 500 remains static at all times. In other words, it operates in "staring" mode.

In sharp contrast, the viewpoint of system 510 scans between multiple pulse positions to realize the same FOV as provided in system 500. In FIG. 5(A)—for clarity—the scan positions are depicted as registered to the sequence of pulses in optical signal 516 and—as a result—are non-overlapping. However, one skilled in the art will readily recognize upon reading this disclosure that the scan positions in system 510 can, and preferably do, overlap depending upon the configuration of the system.

Figure 6A:
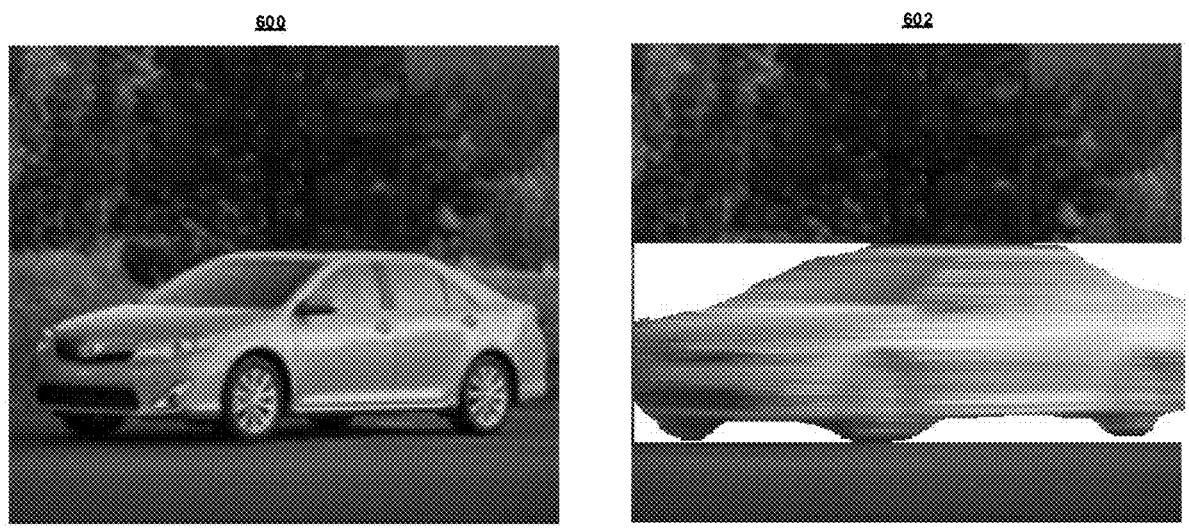
Figure 6B:
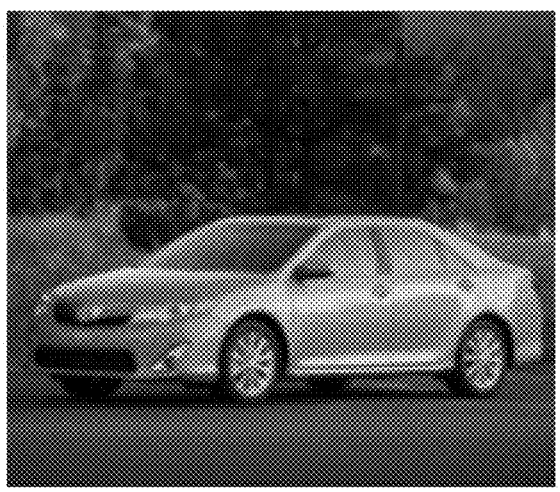
Figure 6B:
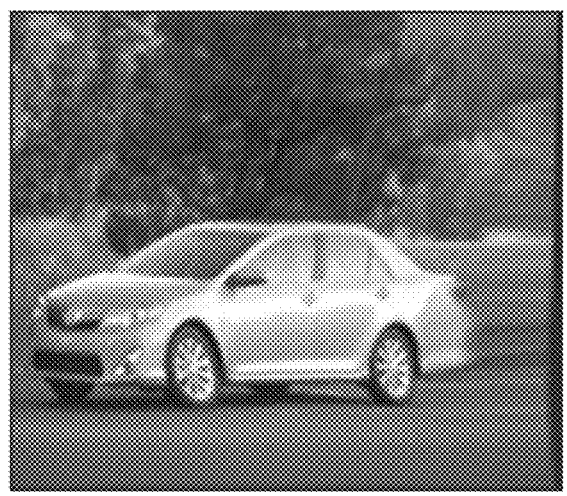

Turning now to FIG. 6(A) and FIG. 6(B), there are shown images 600 and 602 respectively which show—for staring-image-mode image acquisition—corrupted images appear blurry. However, their position will show a smear of points from all locations that the object was during the period of time that the image was integrated—i.e., the frame-integration period.

As may be observed, images 604 and 606 show—for scanning mode image acquisition, corrupted objects appear crisp. However, their position will only show a single specific position that each vertical slice of the object was located during the frame integration period.

Figure 7A:
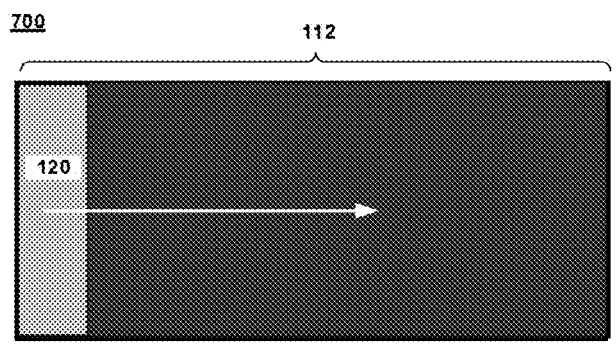
Figure 7B:
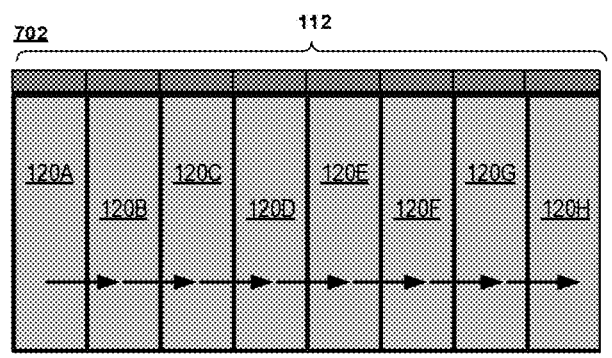

FIG. 7(A) and FIG. 7(B) show two illustrative scanning methods according to aspects of the present disclosure. More particularly, scanning mode 700 is one in which sub-region is swept continuously across the width of the scene. Such a scanning node can advantageously employ a large pixel aperture and high duty cycle (>80%). Further, scanning mode 700 is advantageously scalable to large fields of view.

In contrast, scanning mode 702 is a step-wise scanning mode in which the sub-region is stepped in discrete intervals across the width of the scene. Although relatively straightforward to implement, ste-wise scanning mode wastes image frames.

Note that image blur is dependent upon the ratio of CTOV of sub-region 120 to the TFOV of the scene.

In some illustrative embodiments, stepwise scanning may be implemented in a continuous stepping manner wherein the sub-region is continuously scanned across the scene such that its stepping is precisely timed with the frequency at which the interrogating laser pulses are generated.

Those skilled in the art will also appreciate that—in addition to improved SNR—systems, methods and structures according to the present disclosure provide a number of additional advantageous over prior-art LiDAR systems, methods, and structures. First, by operating in scanning mode—rather than staring mode—the effect(s) of blooming and dazzling artifacts in resultant images is limited to only local pixels in a direction perpendicular to the scan. In fact, as the pixel aspect ratio increases (i.e., the ratio between the y-direction and x-direction of its IFOV), the more locally these artifacts are confined.

Second, the compression of the pixels along the scan axis enables the production of images exhibiting a higher resolution in the scanning direction. Further, objects at close range require fewer frames for integration, therefore they can be resolved more precisely without sacrificing signal confidence.

Third, compression of the pixels along the scan axis requires a longer focal length, however maximum allowable optical aperture diameters scales proportionally with focal length. As a result, aperture size in the scanning axis may be increased proportionally to pixel compressing factor to tune a balance between signal and noise collection.

Finally, scanning enables the signal power to be increased without requiring increased laser power or photon detection efficiency (PDE), therefore it is possible to reduce laser pulse energy to decrease average laser power and improve eye safety.

Figure 8:
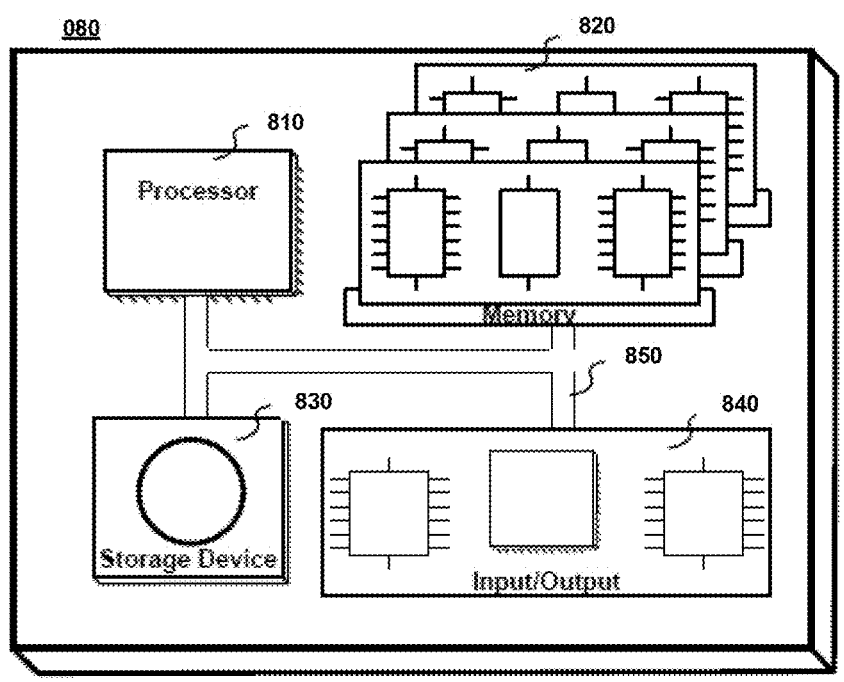
FIG. 8 depicts an illustrative schematic computer system which may control systems and be programmed to provide methods according to aspects of the present disclosure.

FIG. 8 shows an illustrative computer system 800 suitable for implementing methods and incorporation into systems according to an aspect of the present disclosure. As may be immediately appreciated, such a computer system may be integrated into another system may be implemented via discrete elements or one or more integrated components. The computer system may comprise, for example a computer running any of a number of operating systems. The above-described methods of the present disclosure may be implemented on the computer system 800 as stored program control instructions.

Computer system 800 includes processor 810, memory 820, storage device 830, and input/output structure 840. When employed in systems and methods according to the present disclosure, one or more input/output devices may include transmitter(s), receiver(s), and optical control(s) along with light emitters, light receivers, timing and control functions, filters, etc, among other functions. One or more busses 850 typically interconnect the components, 810, 820, 830, and 840. Processor 810 may be a single or multi core.

Processor 810 executes instructions in which embodiments of the present disclosure may comprise steps described previously and/or outlined in one or more of the Drawing figures. Such instructions may be stored in memory 820 or storage device 830. Data and/or information may be received and output using one or more input/output devices.

Memory 820 may store data and may be a computer-readable medium, such as volatile or non-volatile memory. Storage device 830 may provide storage for system 800 including for example, the previously described methods. In various aspects, storage device 830 may be a flash memory device, a disk drive, an optical disk device, or a tape device employing magnetic, optical, or other recording technologies.

At this point, those skilled in the art will readily appreciate that while the methods, techniques and structures according to the present disclosure have been described with respect to particular implementations and/or embodiments, those skilled in the art will recognize that the disclosure is not so limited. Accordingly, the scope of the disclosure should only be limited by the claims appended hereto.

The invention claimed is:

1. A LiDAR system comprising:
   a transmitter operative for interrogating a sub-region of a scene with an optical signal, the scene being characterized by a total field-of view (TFOV) having a first lateral extent along a first direction and a second lateral extent along a second direction that is orthogonal to the first direction, and the optical signal having an illumination pattern having a first divergence in the first direction and a second divergence in the second direction, wherein the sub-region is characterized by a third lateral extent that is defined by the first divergence and a fourth lateral extent that is defined by the second divergence, wherein the fourth lateral extent is smaller than the second lateral;
   a receiver operative for sampling the sub-region by detecting reflections of the optical signal that originate within the sub-region, the receiver including a focal-plane array (FPA) defined by a plurality of pixels that each have a single-photon detector, wherein the complete FPA is configured to image the sub-region with a composite field-of-view (CFOV) that matches the sub-region; and
   a scanner operative for scanning the sub-region along the second direction such that the complete scene is interrogated with the optical signal and sampled by the complete FPA during a scan period.

2. The system according to claim 1 wherein the CFOV is gap free.

3. The system according to claim 1 further comprising a processor operative for receiving signals from the receiver during a scan period and integrating the signals.

4. The system according to claim 1 wherein the sub-region is smaller than the lateral extent of the scene in the first direction, and wherein the scanner is operative for scanning the sub-region along the first direction such that the complete TFOV is interrogated and sampled during a scan period.

5. The system according to claim 1 wherein the second angular range of IFOV is smaller than the first angular range of the IFOV.

6. The system according to claim 1 wherein the scanner is operative for scanning the sub-region along the second direction continuously.

7. The system according to claim 1 wherein the scanner is operative for scanning the sub-region along the second direction step-wise as a plurality of steps, and wherein the lateral extent of each step is matched to the lateral extent of the IFOV of a pixel.

8. A method of operating a LiDAR system comprising:
   interrogating a sub-region of a scene with an optical signal, wherein the scene is characterized by a total field-of-view (TFOV) having a first lateral extent along a first direction and a second lateral extent along a second direction that is orthogonal to the first direction, and wherein the optical signal has an illumination pattern exhibiting a first divergence in the first direction and a second divergence in the second direction, the first divergence defining a third lateral extent of the sub-region and the second divergence defining a fourth lateral extent of the sub-region, wherein the fourth lateral extent is smaller than the second lateral extent;
   sampling the sub-region by detecting reflections of the optical signal that originate within the sub-region, wherein the reflections are detected by a receiver including a plurality of pixels that each have a single-photon detector, and wherein each pixel exhibits an instantaneous field-of-view (IFOV) having a first angular range in the first direction and a second angular range in the second direction, and wherein the plurality of pixels are arranged such that they collectively define a focal-plane array (FPA) that is configured such that the complete FPA images the sub-region with a composite-field-of-view (CFOV) that matches the sub-region; and scanning the sub-region along the second direction such that the complete scene is interrogated with the optical signal and sampled by the complete FPA during a scan period.

9. The method according to claim 8 further comprising configuring the receiver such that the CFOV is gap free.

10. The method according to claim 8 further comprising configuring the receiver such that the second angular range of the IFOV is less than the first angular range of the IFOV.

11. The method according to claim 8 further comprising integrating one or more signals generated by the receiver during a scan period.

12. The method according to claim 11 wherein the scanner continuously scans the sub-region along the second direction.

13. The method according to claim 11 wherein the scanner scans the sub-region along the second direction step-wise as a plurality of steps, wherein the lateral extent of each step is matched to the lateral extent of the sub-region.

14. The method according to claim 11 wherein the scanner scans the sub-region along the second direction step-wise as a plurality of steps, wherein the lateral extent of each step is matched to the lateral extent of the IFOV.

* * * * *